(No Model.)

R. B. HUGUNIN.
ROLLER SASH BALANCE.

No. 286,931. Patented Oct. 16, 1883.

Witnesses:
A. W. Lang
W. L. Sackett

Inventor,
Rob't B. Hugunin

UNITED STATES PATENT OFFICE.

ROBERT B. HUGUNIN, OF HARTFORD, CONNECTICUT.

ROLLER SASH-BALANCE.

SPECIFICATION forming part of Letters Patent No. 286,931, dated October 16, 1883.

Application filed February 4, 1881. (No model.)

*To all whom it may concern:*

Be it known that I, ROBT. B. HUGUNIN, a citizen of the United States, and a resident of the city and county of Hartford, State of Connecticut, have invented certain new and useful Improvements in Roller Sash-Balances, of which the following is a specification.

First, this invention consists in the combined application and use, in a roller sash-balance having a roller-arm, B, and a face-plate, A, of a hook, C, and its connecting-bearing D, situated on the roller-arm and plate, the object being to movably and removably attach these parts together without drilling and riveting them, and, further, by the use of a beveled, rounded, or raised surface on the hook or bearing, allow a side and end play to the arm and roller, enabling the latter to adjust itself to the edge of the sash when the sash or balance is not square with the window-frame or each other, (see Figs. 1, 3, and 5;) second, the combined application and use, with the hook C and bearing D, of the hook-supporting projection F, the object being to keep these parts together until regularly unhooked, (see Figs. 1, 3, and 5;) third, the combined construction and use of roller-axle bearings H H' and roller friction-bearing I, all arranged upon and constructed with arm B, the object being to obtain fixed combined axle holding, raising, and roller bearings solid on the arm, and secure uniform steadiness and efficiency in retaining the sash, and uniformity and simplicity in the construction, (see Figs. 1 and 3;) fourth, in the application and use, with the plate and arm of a sash-balance, of the guideways J J', movable nut-bar K, spring L, washer M, and regulating-screw N, the latter working loosely through the plate A, the object being to enable the nut K to move back and forth with the spring instead of the screw, reducing the rear working-space for the adjusting parts, and avoiding the drilling and tapping of the plate for the screw N, and at the same time allowing the screw play, and obtaining greater uniformity and efficiency in the workings and construction of the balance. (See Figs. 1, 3, and 4.) I obtain these objects by the mechanism illustrated in the accompanying drawings, in which—

Figure 4:
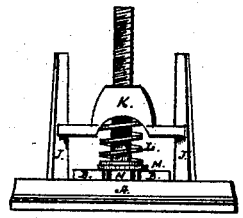
Figure 1:
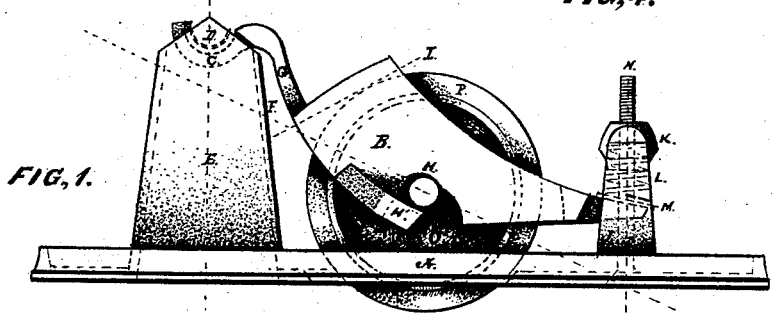
Figure 2:
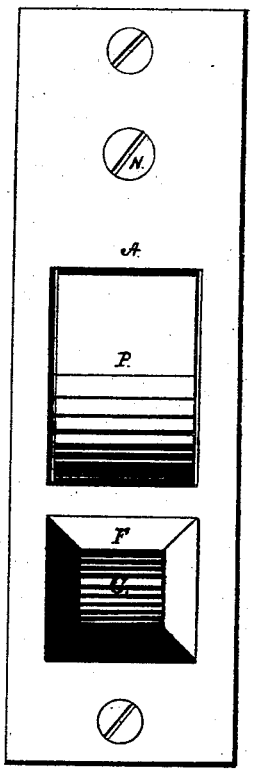
Figure 5:
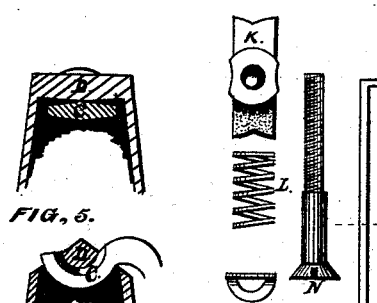
Figure 5:
Figure 3:
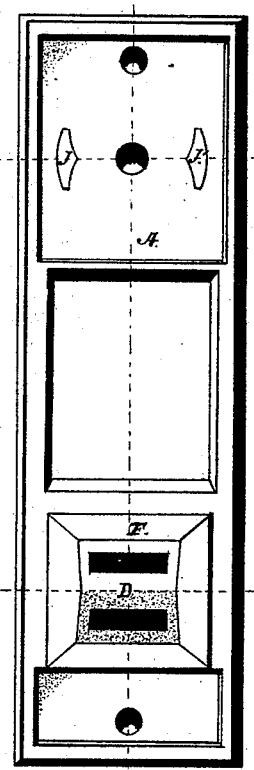

Figure 1 is a longitudinal elevation of the balance, showing the features of my invention. Fig. 2 is a front plan view of the same. Fig. 3 is a rear view of the plate A, with side views illustrating the various parts of my balance. Fig. 4 is an end view of the upper end, showing the arrangements of the adjusting parts. Fig. 5 is a detailed illustration of the hook-attaching parts.

Similar letters of reference indicate corresponding parts in all the views.

The face-plate A has a sand-core cavity, E, an opening for the roller, two guideways, J J', an opening for the regulating-screw N, and two screw-holes for attaching the same to the window-frame.

The roller-arm B has an attaching-hook, C, axle-bearings H H', and roller-bearing I.

The attaching-hook C, I construct on the neck end of arm B, and its inner or hook surface I make beveled each way from its longitudinal center to its side edges, or, with their equivalents, a narrow raised bearing-surface along this center, or with a rounded surface. This construction of the hook with a plain bearing, D, or the latter constructed as above described, and the hook plain, or both may be similarly constructed when the two are attached together, will allow the arm and its confined roller to rock sidewise, and its upper end to vary sufficiently vertically to overcome any ordinary bevel that exists on the edge of the sash, or from accidentally placing the balance on an angle with the window-frame. This arrangement insures a full bearing for the roller the full width of its surface on the edge of the sash, which would not be the case if the roller-arm be secured to the plate with a rivet. To have a sash raise freely with a roller-balance, the axles of the roller should be at right angles with the vertical line of movement; otherwise the sash will be forced against one of its stops and friction be created. In this construction the roller is enabled to adjust itself to the position of least friction.

The attaching-bearing D, I make upon the plate A by means of the sand-core cavity E. This bearing is made straight from end to end, or beveled, as before described, and is located in the rear of the plate A. The farther back it is located from the plate the more the cam action of the roller, &c. The sand-core cavity E enables the casting of the bar D or hook C, if their positions be reversed upon the arm and plate, directly upon and with the plate A. It can be varied in form to accommodate the form of bearing preferred on the plate.

The hook-supporting projection F keeps the hook in connection with its bearing until the same is regularly detached. The form of this projection is not important further than sufficient play be allowed to accommodate the rocking movement of the arm and roller previously described.

The connecting-neck G is situated between the arm B and the hook C.

The axle-bearings H H' are made upon the arm B by projecting the lower portions of the sides of the arm outwardly sufficient to allow the sand-cores that form them to draw through in molding. The construction of these bearings directly upon the arm B gives uniform and solid support to the roller and efficiency in the working of the balance.

The roller-bearing I on the arm B is a tangent plane to the surface of the roller, forming an angle of about fifty degrees with the radius plane passing between the roller-axle bearings H H'. (See Fig. 1.) This permanent arrangement of the bearings H H' and I with reference to each other and the roller on the arm B insures continued efficiency in the workings until the covering of the roller, after long use, shall become worn out, the simple re-covering of which renders the balance again efficient.

The guideways J J', I make on the plate A, with their sides facing each other, corresponding with the ends of the movable bar K, which they confine from turning while turning the regulating-screw N.

The nut-bar K, through which the screw N passes, confines the spring L, it being made preferably with a cavity extending deep enough to accommodate the spring when its coils are set together, allowing the roller-arm to work back to the bar, having space in the workings of the adjusting parts. The spring L is confined between the nut-bar and arm B. By means of this spring, propelled by bar K and drawn by the screw N, the roller is drawn to the required pressure against the sash, the elasticity of this spring allowing the roller to yield to any unequal widths occurring in the sash.

The washer M is used as a spring-seat on arm B.

The regulating-screw N passes through the plate A, washer M, spring L, and bar K, the latter having a female thread corresponding with the thread on the screw. By turning this screw from the face of the plate A, the pressure of the roller is regulated against the sash, the screw remaining stationary. The pressure upon the spring is caused by the movements of the bar K, as before described.

The metal roller O is cast with a thin web through its transverse center, from which the roller-axles project sufficiently to rest on their bearings H H' on the arm B when in place.

The roller-covering P is a fibrous compound expressly made for this purpose and of great durability. When the castings composing the parts of my balance are properly made, and the bar K drilled and tapped for the regulating-screw N, and the roller covered with the compound P, it is placed in the arm B, the hook C is attached to bearing D, the regulating-screw N is passed through the plate A, washer M, spring L, and bar K, which is then secured by drawing the screw N, which brings it within the guiding-ways J J', after which the balance is complete, ready for application to its working position in the window-frame. Two of these balances are generally used for each sash, placed in the sash-channels of the frame—for the lower sash, with their regulating-screw heads standing just full above the meeting-rail when that sash is down, and for the upper sash, with the lower end of the balance-plate A down even with the under side of the meeting-rail when that sash is closed up. The adjustments to the weights of the sashes are made by turning the regulating-screws with a screw-driver to draw the bars K alike for each pair of balances for each sash, trying the working of the sash with the hand until a firm holding-power be obtained. These screws are reached by lowering the tops of the sashes to them. With these balances the sashes work similarly to those hung with weights, no catches to unloose being employed.

What I claim as my invention, and desire to secure by Letters Patent, is—

1. In a roller sash-balance using a roller-arm, B, and an attaching-plate, A, the hook C and its bearing D, for movably and removably connecting the arm and plate, substantially as and for the purposes herein set forth.

2. In a roller sash-balance, the combination of the arm B, plate A, hook C, bearing D, and hook-supporting projections F, substantially as and for the purposes specified.

3. In a roller sash-balance having a roller-arm, B, and plate A, the combined arrangement and construction directly upon the arm B of axle holding and raising bearings H H' and roller-holding friction-surface I, substantially as and for the purposes specified.

4. In a sash-balance having arm B and plate A, the guideways J J', in combination with the movable nut-bar K, spring L, and regulating-screw N, all arranged and working substantially as and for the purposes herein set forth.

ROBT. B. HUGUNIN.

Witnesses:
S. W. ADAMS,
A. W. LANG.